United States Patent
Hosono et al.

(10) Patent No.: US 10,173,202 B2
(45) Date of Patent: Jan. 8, 2019

(54) SUPPORTED METAL CATALYST AND METHOD OF SYNTHESIZING AMMONIA USING THE SAME

(71) Applicants: JAPAN SCIENCE AND TECHNOLOGY AGENCY, Kawaguchi-shi (JP); TOKYO INSTITUTE OF TECHNOLOGY, Meguro-ku (JP)

(72) Inventors: Hideo Hosono, Tokyo (JP); Michikazu Hara, Tokyo (JP); Masaaki Kitano, Tokyo (JP); Toshiharu Yokoyama, Tokyo (JP); Yasunori Inoue, Tokyo (JP); Shinji Kambara, Tokyo (JP)

(73) Assignees: JAPAN SCIENCE AND TECHNOLOGY AGENCY, Kawaguchi-shi (JP); TOKYO INSTITUTE OF TECHNOLOGY, Meguro-ku (JP)

( * ) Notice: Subject to any disclaimer, the term of this patent is extended or adjusted under 35 U.S.C. 154(b) by 0 days.

(21) Appl. No.: 15/121,702

(22) PCT Filed: Feb. 12, 2015

(86) PCT No.: PCT/JP2015/053853
§ 371 (c)(1),
(2) Date: Aug. 25, 2016

(87) PCT Pub. No.: WO2015/129471
PCT Pub. Date: Sep. 3, 2015

(65) Prior Publication Data
US 2016/0361712 A1 Dec. 15, 2016

(30) Foreign Application Priority Data
Feb. 27, 2014 (JP) .................. 2014-037370

(51) Int. Cl.
*C01C 1/04* (2006.01)
*B01J 35/00* (2006.01)
(Continued)

(52) U.S. Cl.
CPC ............ *B01J 27/24* (2013.01); *B01J 23/462* (2013.01); *B01J 23/745* (2013.01); *B01J 23/75* (2013.01);
(Continued)

(58) Field of Classification Search
CPC ........... H01L 51/5221; C04B 2235/664; C04B 35/62645; C04B 2235/3208; C04B 35/44;
(Continued)

(56) References Cited

U.S. PATENT DOCUMENTS 3,770,658 A * 11/1973 Ozaki ...................... B01J 23/16
502/178
6,235,676 B1 5/2001 Jacobsen et al.
(Continued)

FOREIGN PATENT DOCUMENTS

CN 1973982 A 6/2007
CN 103977828 A 12/2013
(Continued)

OTHER PUBLICATIONS

Xie et al. "Structure and Properties of a New Electride . . . " J. Am. Chem. Soc. 2000, 122, 6971-6978.*
(Continued)

*Primary Examiner* — Amber R Orlando
*Assistant Examiner* — Syed T Iqbal
(74) *Attorney, Agent, or Firm* — Oblon, McClelland, Maier & Neustadt, L.L.P.

(57) ABSTRACT

A catalyst is provided which is used for continuously synthesizing ammonia using a gas containing hydrogen and nitrogen as a raw material, wherein a transition metal which (Continued)

exhibits catalytic activity is supported by a support, and the support is a two-dimensional electride or a precursor thereof. The two-dimensional electride or the precursor thereof is a metal nitride represented by MxNyHz (M represents one or two or more of Group II metals selected from the group consisting of Mg, Ca, Sr and Ba, and x, y and z are in ranges of $1 \leq x \leq 11$, $1 \leq y \leq 8$, and $0 \leq z \leq 4$ respectively, in which x is an integer, and y and z are not limited to an integer) or $M_3N_2$ (M is the same as above), or a metal carbide selected from the group consisting of $Y_2C$, $Sc_2C$, $Gd_2C$, $Tb_2C$, $Dy_2C$, $Ho_2C$ and $Er_2C$. These catalysts are used for continuously reacting nitrogen with hydrogen, which are raw materials, on the catalyst, wherein the reaction is performed in an ammonia synthesis reaction system under the preferable conditions of a reaction temperature which is equal to or higher than 100° C. and equal to or lower than 600° C., and a reaction pressure which is equal to or higher than 10 kPa and lower than 20 MPa.

20 Claims, 2 Drawing Sheets

(51) Int. Cl.
  *B01J 27/24* (2006.01)
  *B01J 27/22* (2006.01)
  *B01J 23/46* (2006.01)
  *B01J 35/10* (2006.01)
  *C01B 21/06* (2006.01)
  *B01J 23/745* (2006.01)
  *B01J 23/75* (2006.01)

(52) U.S. Cl.
  CPC ........... *B01J 27/22* (2013.01); *B01J 35/0006* (2013.01); *B01J 35/1009* (2013.01); *C01B 21/0612* (2013.01); *C01C 1/0411* (2013.01); *C01P 2006/12* (2013.01); *Y02P 20/52* (2015.11)

(58) Field of Classification Search
  CPC ..... C23C 14/3414; C23C 14/35; C23C 14/08; H01B 1/08; B01J 23/462; B01J 23/745; B01J 23/75; B01J 27/22; B01J 27/24; B01J 35/0006; B01J 35/1009; C01B 21/0612; C01C 1/0411; C01P 2006/12; Y02P 20/52
  See application file for complete search history.

(56) References Cited

U.S. PATENT DOCUMENTS

| | | | | |
|---|---|---|---|---|
| 6,764,668 | B2* | 7/2004 | Jacobsen ............... | B01J 23/462 423/362 |
| 2004/0057891 | A1* | 3/2004 | Nielsen .................. | B01J 23/462 423/362 |
| 2008/0213157 | A1* | 9/2008 | McGrady .............. | C01C 1/0405 423/353 |
| 2011/0114075 | A1* | 5/2011 | Mills ........................ | C01B 3/00 126/263.01 |
| 2012/0225005 | A1 | 9/2012 | Suzuki et al. | |
| 2013/0183224 | A1 | 7/2013 | Hosono et al. | |
| 2015/0126792 | A1* | 5/2015 | Kauffman ................ | B01J 21/04 585/660 |
| 2015/0239747 | A1 | 8/2015 | Hosono et al. | |

FOREIGN PATENT DOCUMENTS

| | | | | |
|---|---|---|---|---|
| CN | 103977828 | A | 8/2014 | |
| CN | 103977828 | A | 8/2014 | .............. B01J 27/24 |
| EP | 1 095 906 | A2 | 5/2001 | |
| JP | 2000-264625 | A | 9/2000 | |
| JP | 2001-96163 | A | 4/2001 | |
| JP | 2005-126273 | A | 5/2005 | |
| JP | 2006-7064 | A | 1/2006 | |
| JP | 4038311 | B2 | 1/2008 | |
| JP | 4585043 | B1 | 11/2010 | |
| JP | 2012-66991 | A | 4/2012 | |
| JP | 2014-24712 | A | 2/2014 | |
| JP | 5627105 | B2 | 11/2014 | |
| WO | WO 2012/077658 | A1 | 6/2012 | |
| WO | WO 2014/034473 | A1 | 3/2014 | |

OTHER PUBLICATIONS

International Search Report dated Mar. 17, 2015 in PCT/JP2015/053853, filed Feb. 12, 2015.
Kimoon Lee et al. "Dicalcium Nitride as a Two-Dimensional Electride with an Anionic Electron Layer", Nature, vol. 494, Feb. 21, 2013, pp. 6 pages.
Xiao Zhang et al. "Two-Dimensional Transition-Metal Electride $Y_2C$", Chemistry of Materials, vol. 26, 2014, pp. 6638-6643.
Tomofumi Tada et al. "High-Throughput ab Initio Screening for Two-Dimensional Electride Materials", Inorganic Chemistry, vol. 53, 2014, pp. 10347-10358.
Peter Hoehn et al. "β-$Ca_3N_2$, a Metastable Nitride in the System Ca-N", Chem. Eur. J. vol. 15, 2009, pp. 3419-3425.
Aron Walsh et al. "Electron Excess in Alkaline Earth Sub-Nitrides: 2D Electron Gas or 3D Electride?", Journal of Materials Chemistry C, vol. 1, 2013, pp. 3525-3528.
Masaaki Kitano et al. "Ammonia Synthesis Using a Stable Electride as an Electron Donor and Reversible Hydrogen Store", Nature Chemistry, vol. 4, Nov. 2012, pp. 934-940.
Yasunori Inoue et al. "Highly Dispersed Ru on Electride $[Ca_{24}Al_{28}O_{64}]^{4+}$ $(e-)_4$ as a Catalyst for Ammonia Synthesis", ACS Catalysis, vol. 4, 2014, pp. 674-680.
Extended European Search Report dated Oct. 20, 2017 in Patent Application No. 15755657.2.
Dariusz Szmigiel, et al. "Ammonia synthesis over the Ba-promoted ruthenium catalysts supported on boron nitride", Catalysis Letter, vol. 100, Nos. 1-2, 2005, pp. 79-87.
Ryoichi Kojima, et al. "Molybdenum nitride and carbide catalysts for ammonia synthesis", Applied Catalysis A: General, vol. 219, No. 1-2, 2001, pp. 141-147.
Combined Chinese Office Action and Search Report dated Feb. 1, 2018 in Chinese Patent Application No. 201580010443.1 (with English translation), citing document AO therein, 13 pages.
CN Office Action in Application No. 201580010443.1, dated Sep. 17, 2018.

* cited by examiner

SUPPORTED METAL CATALYST AND METHOD OF SYNTHESIZING AMMONIA USING THE SAME

TECHNICAL FIELD

The present invention relates to a catalyst in which metal is carried on a support, particularly relates to a supported metal catalyst for synthesizing ammonia, which includes an electride (an electronic product) as the support, wherein the electride is a substance in which an electron exists between layers of a layered compound as an anionic electron, and a method of synthesizing ammonia using the catalyst.

BACKGROUND ART

Alkaline earth metal nitride represented by $M_3N_2$ (M represents Ca, Sr or Ba) is used for a raw material of aluminum nitride which is used in a semiconductor device, ceramic particles for a metal sliding member, a material for forming a battery electrode, conductive fine particles, and the like (Patent Document 1). Patent Document 1 discloses a method of producing $M_3N_2$ (M represents Be, Mg, Ca, Sr or Ba), $M_2N$ (M represents Be, Mg, Ca, Sr or Ba) or the like, wherein a Group II metal amide is thermally decomposed, and Patent Document 2 discloses a method of producing high-purity $M_3N_2$ (M represents Be, Mg, Ca, Sr or Ba), wherein ammonia is reacted with a Group II metal to be liquefied, and the obtained Group II metal amide is thermally decomposed.

As a calcium nitride, $\alpha$-$Ca_3N_2$, $\beta$-$Ca_3N_2$, $\gamma$-$Ca_3N_2$, $Ca_{11}N_8$, $Ca_2N$ and the like are known. In addition, $Ca_2NH$, $CaNH$, $Ca(NH_2)_2$ and the like (hereinafter, may be referred as a "Ca—N—H-based compound" in some cases), which are hydrides of the calcium nitride are also known.

$Ca_3N_2$ is obtained by dissolving Ca in liquid ammonia and performing thermal decomposition under a nitrogen atmosphere. As shown in the following formula, $Ca_3N_2$ reacts with moisture in air to generate calcium hydroxide and ammonia. This reaction also occurs in water.

$$Ca_3N_2 + 6H_2O \rightarrow 3Ca(OH)_2 + 2NH_3$$

In addition, it is known that $Ca_2N$ is easily oxidized, and is a very unstable material. It has been informed that $Ca_2N$ can stably exist in Ar in a range which is equal to or less than 1000° C., or in nitrogen in a range which is between 250° C. to 800° C. (Non Patent Document 1).

On the other hand, in 2013, the present inventors found that $Ca_2N$ is a two-dimensional electride (Non Patent Document 2). $Ca_2N$:$e^-$ is a layered compound in which electrons are linked with each other as an anion between layers formed by $[Ca_2N]^+$, and is obtained by heating $Ca_3N_2$ and metal Ca in a vacuum. It has been reported that a conductive electron concentration of $Ca_2N$:$e^-$ is $1.39 \times 10^{22}$/cm$^3$, and a work function thereof is 2.6 eV. Thereafter, the two-dimensional electride is reported in Non Patent Document 3.

Further, the application for a patent has been filed by the present inventors with respect to an invention relating to a nitride electride which consists of a nitride, wherein the nitride has a layered crystal structure and is represented by ion formula $[AE_2N]^+e^-$ (AE represents at least one element selected from Ca, Sr and Ba) (Patent Document 3).

On the other hand, as a synthesis of ammonia in which a gas containing hydrogen and nitrogen is used as a raw material, a Haber-Bosch method which uses an iron oxide as a catalyst and uses alumina or potassium oxide as a promoter has been widely used, and the synthesis method has not been significantly changed for the past 100 years. The synthesis of ammonia according to the Haber-Bosch method is performed by reacting nitrogen and hydrogen gases on the catalyst under a high temperature and a high pressure, which are in a range of 300° C. to 500° C. and in a range of 20 to 40 MPa.

As a catalyst used for synthesizing ammonia, a ternary nitride of a Group VIII metal and a Group VIB metal (Patent Document 4), a cobalt-molybdenum composite nitride (Patent Document 5) and the like are known. The present inventors have developed a supported metal catalyst in which a mayenite type compound is used as a support of an ammonia synthesis catalyst (Patent Documents 6 and 7, and Non Patent Documents 4 and 5).

BACKGROUND ART DOCUMENTS

Patent Documents

[Patent Document 1] Japanese Patent No. 4585043 (US 2012225005 A1)

[Patent Document 2] Japanese Unexamined Patent Application, First Publication No. 2012-66991 (Japanese Patent No. 5627105)

[Patent Document 3] Japanese Unexamined Patent Application, First Publication No. 2014-24712

[Patent Document 4] Japanese Unexamined Patent Application, First Publication No. 2000-264625 (U.S. Pat. No. 6,235,676 B1)

[Patent Document 5] Japanese Unexamined Patent Application, First Publication No. 2001-096163 (Japanese Patent No. 4038311)

[Patent Document 6] WO2012/077658 (US 2013183224 A1)

[Patent Document 7] WO2014/034473

Non-Patent Documents

[Non Patent Document 1] P. Hehn, S. Hoffmann, J. Hunger, S. Leoni, F. Nitsche, W. Schnelle, and R. Kniep, "Chem. Eur. J.", 15, 3419 (2009)

[Non Patent Document 2] K. Lee, S. W. Kim, Y. Toda, S. Matsuishi and H. Hosono, "Nature", 494, 336-341 (2013)

[Non Patent Document 3] A. Walsh and D. O. Scanlon, "Journal of materials Chemistry" C, 1, 3525-3528 (2013)

[Non Patent Document 4] M. Kitano, Y Inoue, Y. Yamazaki, F. Hayashi, S. Kanbara, S. Matsuishi, T. Yokoyama, S. W. Kim, M. Hara and H. Hosono, "Nature Chemistry" vol. 4, 934-940 (2012)

[Non Patent Document 5] Y Inoue, M. Kitano, S. W. Kim, T. Yokoyama, M. Hara and H. Hosono, "ACS Catal." 4(2), 674-680 (2014)

SUMMARY OF INVENTION

Problem to be Solved by the Invention $Ca_3N_2$ is used as a raw material of aluminum nitride which is used for a semiconductor device, ceramic particles for a metal sliding member, a material for forming a battery electrode, conductive fine particles and the like. However, $Ca_2N$ is known to be a very unstable material, and the use thereof has been hardly developed, and studies regarding a structure and physical properties thereof have hardly been carried out.

Although a catalyst which uses Fe particles as active metals was mainly used as a catalyst of ammonia synthesis in recent years, a Ru/C catalyst which uses active carbon as a support has been also used. After the discovery of an iron oxide catalyst, various catalytic metals and support materials have been researched and developed, and most of combinations of known metals and supports have been examined thoroughly. It is very difficult to find a catalyst having activity which is far higher than activity which is obtained by the combinations of known metals and supports, and particularly, to find a new catalyst which is chemically and thermally stable and has high activity without using a large amount of a promoter.

Means for Solving the Problems

In the study regarding a substance structure and physical properties of the calcium nitride, the present inventors have found that, as described above, $Ca_2N$ is a layered compound in which electrons are linked with each other as an anion at the position between layers formed by $[Ca_2N]^+$, that is, $Ca_2N$ is an electride (an electronic product) in which the layers are linked by the electrons existing between the layers. The electride is represented by a chemical formula of $[Ca_2N]^+.e^-$, and the electride can be referred to as a "two-dimensional electride" since electrons having a concentration, which is expected from stoichiometry, exist in a gap between the layers of the layered compound, that is, a two-dimensional gap. In the two-dimensional electride, the electrons exist in a spatial gap as two-dimensionally delocalized anionic electrons, and thus it is possible to very smoothly move in the entire substance.

The present inventors have found that, even though the aforementioned $Ca_2N$ is a very unstable substance, unexpectedly, the high-temperature reaction properties of the calcium nitride are very efficient for performing continuous synthesis of ammonia using a gas containing hydrogen and nitrogen as a raw material.

That is, the present inventors have found that, when a supported metal catalyst is formed by supporting transition metals such as Ru, Fe, and Co (hereinafter, referred to as "transition metals such as Ru"), which exhibit catalytic activity in ammonia synthesis, on $Ca_2N$, ammonia synthesis catalysts can be generated wherein the ammonia synthesis activity thereof is remarkably improved, the catalyst is stable even when the synthesis reaction is performed for a long period of time without a promoter compound such as unstable alkaline metals, alkaline earth metals or the compounds thereof, and the catalyst has remarkably high performance compared with the related art.

Further, it has been found that in a case where the transition metals catalyst such as Ru is supported by $Ca_3N_2$, which is one type of the calcium nitride, the structure of the support is changed from the $Ca_3N_2$ structure to a $Ca_2N$ structure of the two-dimensional electride during the synthesis reaction of ammonia, and high catalytic activity is exhibited. That is, $Ca_3N_2$ can be used as a precursor of the two-dimensional electride which is formed of $Ca_2N$.

The high catalytic activity as described above is a unique property caused by the two-dimensional electride, and it is possible to obtain the same effect when $Sr_2N$ or $Ba_2N$, which is a nitride represented by the ionic formula $[AE_2N]^+e^-$ which is the same with that of $Ca_2N$, is used as a support. In addition, a part of Ca of $Ca_2N$, Sr of $Sr_2N$, and Ba of $Ba_2N$ may be substituted with at least one or more of alkaline metal elements selected from the group consisting of Li, Na, K, Rb and Cs.

In addition, such a high catalytic activity is considered as a common universal property which is obtained in a case where two-dimensional electride, which is formed of a carbide such as $Y_2C$, $Sc_2C$, $Gd_2C$, $Tb_2C$, $Dy_2C$, $Ho_2C$ and $Er_2C$, which is a layered compound similar to that of $Ca_2N$, and the precursor substance thereof are used as a support. The present inventors also confirmed that, as described in Example 5, high catalytic activity is shown when catalyst is used in which $Y_2C$, which is a carbide, is used as a support of transition metals such as Ru, similar to the case where $Ca_2N$ is used as the support. Since it is considered that $Y_2C$ can be represented by ionic formula $[Y_2C]^{2+}.2e^-$ similar to $Ca_2N$, and a portion of electrons existing between layers is easily substituted with hydrogen during the reaction so as to form a structure of hydride, it is inferred that the hydride also contribute to the catalytic activity.

In addition, $Ca_2NH$, CaNH, and $Ca(NH_2)_2$ (referred to as a "Ca—N—H-based compound" in some cases), which are hydrides of calcium nitride, are known as well. It is inferred that these compounds also contribute to the catalytic activity, and that the structure of hydrides such as $Ca_2NH$ or CaNH is known as a precursor of $Ca_2N$ and is generated when $Ca_3N_2$ is changed to $Ca_2N$ during the ammonia synthesis reaction.

There was a previous document (Non Patent Document 4) in which the reaction of producing ammonia by causing each of $Sr_3N_2$, $Be_3N_2$, $Ca_3N_2$, $Ba_3N_2$ or $Mg_3N_2$ to react with hydrogen was calculated in the past. However, the reaction shown therein is stoichiometric reaction, and it is not possible to continuously produce ammonia. On the other hand, the method which uses the catalyst of the present invention is a method which can continuously produce ammonia by using a catalyst in which nano particles of transition metal are supported by the two-dimensional electride.

[Non Patent Document 4] Thermodynamics of synthesis of ammonia through a calcium nitride-hydride system, Kondrat'ev, A. V.; Beglov, B. M.; Rylov, A. A. Deposited Doc. Avail. BLLD. (1975), (VINITI 2626-75), 10 pp The supported metal catalyst of the present invention can be produced by using a method such as an impregnation method, a physical mixing method, a thermal decomposition method, a liquid phase method and a vapor deposition method. The supported metal catalyst is preferably produced by depositing the transition metals such as Ru so as to be supported on powder or a molded body of a compound, which composes a support, using thermal decomposition of a complex of transition metal such as Ru. It is possible to continuously synthesize ammonia with high efficiency by reacting nitrogen with hydrogen, which are raw materials, on the catalyst, wherein the reaction is performed using the catalyst in an ammonia synthesis reaction device under the conditions of a reaction temperature which is equal to or higher than 100° C. and equal to or lower than 600° C., and preferably a reaction pressure which is equal to or higher than 10 kPa and lower than 20 MPa.

For example, when Ru is supported by the two-dimensional electride such as $Ca_2N$ or $Y_2C$, the catalyst of the present invention shows activity which exceeds the activity of Ru—Cs/MgO which is the supported metal catalyst exhibiting the highest level of activity among the catalysts which are conventionally used. The activity of the catalyst of the present invention exhibits the activity which is equal to or greater than that of Ru/C12A7:$e^-$, which is a supported metal catalyst developed by the present inventors, and which uses a mayenite type compound containing a conduction electron which is equal to or greater than $10^{18}$ $cm^{-3}$ as a support. Further, in a case where Ru is supported by $Ca_3N_2$, the structure of the support is changed from $Ca_3N_2$ to $Ca_2N$ which is the two-dimensional electride and to the "Ca—

N—H-based compound" such as $Ca_2NH$, $CaNH$, and $Ca(NH_2)_2$ during the ammonia synthesis reaction, and the catalyst exhibits two times or more the catalytic activity compared with Ru/C12A7:e⁻ in a low temperature area which is equal to or lower than 340° C.

Effects of Invention

When the catalyst of the present invention is used, it is possible to synthesize ammonia with low energy consumption, by using an inexpensive compound which merely includes elements which are ranked in a high order of Clarke number such as calcium, nitrogen and hydrogen, at a low reaction pressure which is preferably equal to or greater than 10 kPa and lower than 20 MPa, and further preferably in a range of 10 kPa to 10 MPa, in a method in which ammonia is continuously synthesized by the reaction of hydrogen and nitrogen. In addition, even if the synthesis reaction is repeatedly performed, the catalytic activity is not deteriorated, and thus it is possible to synthesize ammonia with chemical and thermal stability at high efficiency for a long period of time.

Further, transition metal elements other than expensive rare metals such as Ru, for example, Fe and Co can be used as supporting materials, and are useful from the viewpoint of the effective use of resources. In addition, unlike the conventional support such as alumina, there is no need to add a promoting compound such as an alkaline metal, an alkaline metal compound and an alkaline earth metal compound, and thus the production is simply and conveniently performed.

DETAILED DESCRIPTION OF THE INVENTION

The present invention relates to a catalyst for continuously synthesizing ammonia wherein a gas containing hydrogen and nitrogen is used as a raw material in the synthesis. In the catalyst, a transition metal which exhibits catalytic activity is supported by a support, and the support is a two-dimensional electride or a precursor thereof.

The two-dimensional electride or the precursor thereof is represented by MxNyHz (here, M represents one or two or more of Group II metals selected from the group consisting of Mg, Ca, Sr and Ba, and x, y, and z are in ranges of 1≤x≤11, 1≤y≤8, and 0≤z≤4, respectively, in which x is an integer, and y and z are not limited to an integer). In the aforementioned formula, when z=0, the formula represents a metal nitride, and when 0<z, the formula represents a hydride. N may cause a defect in some cases, and therefore y is not limited to an integer. In addition, hydrogen is incorporated into the metal nitride, and thus z is not limited to an integer.

Representative examples of the metal nitride include the metal nitride represented by $M_3N_2$ (here, M represents one or two or more of Group II metals selected from the group consisting of Mg, Ca, Sr and Ba), when x=3, y=2 and Z=0. Specific examples of the metal nitride include the calcium nitride represented by $Ca_3N_2$ or $Ca_2N$ in a case where M is Ca. The two-dimensional electride or the precursor thereof is not limited to the metal nitride, but may a metal carbide selected from the group consisting of $Y_2C$, $Sc_2C$, $Gd_2C$, $Tb_2C$, $Dy_2C$, $Ho_2C$ and $Er_2C$, or may be a hydride thereof.

Hereinafter, a catalyst of the present invention, a method of producing the catalyst, and a method of synthesizing ammonia using the catalyst (hereinafter, referred to as a "method of the present invention") will be specifically described by exemplifying a calcium nitride as a specific example. Regarding other two-dimensional electride compounds, the description can be also used in the same way.

As examples of a calcium nitride-based compound and hydride thereof, α-$Ca_3N_2$, β-$Ca_3N_2$, γ-$Ca_3N_2$, $Ca_{11}N_8$, $Ca_2N$, $Ca_2NH$, $CaNH$, and $Ca(NH_2)_2$ are known, and Ca can be included up to 11, N can be included up to 8, and H can be included up to 4. Accordingly, the calcium nitride and the "Ca—N—H-based compound" of the catalysts of the present invention are comprehensively represented by formula CaxNyHz (here, M represents one or two or more of Group II metals selected from the group consisting of Mg, Ca, Sr and Ba, and x, y, and z are in ranges of 1≤x≤11, 1≤y≤8, and 0≤z≤4, respectively, in which x is an integer, and y and z are not limited to an integer). When 0<z, the formula represents the hydride, and in the case of the hydride, z may be a value which is less than 1, and therefore z is not limited to an integer.

Further, it is considered that the metal nitrides such as $Mg_3N_2$, $Sr_2N$ and $Ba_2N$ other than the calcium nitride also change the structure thereof similar to the structure of $Ca_3N_2$ during the ammonia synthesis reaction. Thus nitride or nitride containing hydrogen of the catalysts of the present invention can be represented by formula MxNyHz (here, M represents one or two or more of Group II metals selected from the group consisting of Mg, Ca, and Sr, and Ba, and x, y, and z are in ranges of 1≤x≤11, 1≤y≤8, and 0≤z≤4, respectively, in which x is an integer, and y and z are not limited to an integer).

<Synthesizing of Calcium Nitride>

The calcium nitride ($Ca_3N_2$) is commercially available, and can be obtained by using a method of dissolving metal calcium in liquid ammonia, and thermally decomposing the obtained calcium amide in a nitrogen gas stream. For example, the calcium nitride ($Ca_2N$) is obtained by heating $Ca_3N_2$ with metal calcium at approximately 1000° C. in a vacuum condition.

<Synthesizing of Ca—N—H-Based Compound Catalyst>

The hydride of the calcium nitride represented by formula CaxNyHz (x, y, and z are in ranges of 1≤x≤11, 1≤y≤8, and 0<z≤4, in which x is an integer, and y and z are not limited to an integer) is also used as a support and exhibits high catalytic activity similar to $Ca_2N$. Specific examples of the Ca—N—H-based compound include $Ca_2NH$, $CaNH$, $Ca(NH_2)_2$ and the like.

When the ammonia synthesis is performed by supporting a transition metal element catalyst such as Ru on the calcium nitride ($Ca_3N_2$), $Ca_3N_2$ is reduced during the synthesis reaction, and is changed to Ru-supported $Ca_2N$, a Ru-supported Ca—N—H compound, or a mixed compound thereof. In addition, as another method, $Ca_3N_2$ or $Ca_2N$ is heated at approximately 500° C. in the hydrogen gas stream to obtain the Ca—N—H compound, and the obtained Ca—N—H compound functions as a catalyst by supporting the transition metal element such as Ru thereon.

<Step of Supporting Transition Metal Such as Ru>

The transition metal element is used for various types of synthesis reactions as a homogenous catalyst and a heterogeneous catalyst. It is known that particularly, a Group VI, Group VIII, or Group IX transition metal such as Fe, Ru, Os, Co and Mo is suitably used as the catalyst which is used to synthesize ammonia by direct reaction between hydrogen and nitrogen. In the present invention, as the transition metal element, each element of a Group IV metal selected from Cr, Mo and W, a Group VII metal selected from Mn, Tc and Re, a Group VIII metal selected from Fe, Ru and Os, and a Group IX metal selected from Co, Rh and Ir can be used alone or in combination thereof. In addition, the compounds of these elements such as $Co_3Mo_3N$, $Fe_3Mo_3N$, $Ni_2Mo_3N$ and $Mo_2N$ can be used.

In a case where the support such as the calcium nitride and the Ca—N—H-based compound are used, a substance obtained in the step of synthesizing the calcium nitride is mixed with the transition metal compound such as Ru by using an impregnation method and a physical mixing method. Examples of the physical mixing method include a method performed in such a manner that the complex of metal such as Ru is mixed with the calcium nitride while being pulverized by using a mortar, a mixing method performed by putting them in a glass tube and shaking or rotating a glass tube after sealing the glass tube, and a pulverizing and mixing method performed by a ball mill.

In a case where a solid sintered body, a thin film or a solid single crystal is used as a support, it is possible to use an impregnation method, similar to powder or a porous body, and a method wherein the transition metal compound such as Ru is deposited on the surface of the support by using a CVD method (chemical vapor deposition method), a sputtering method and the like, and the transition metal compound is thermally decomposed so as to deposit the transition metals. In a case of using the aforementioned compound of the transition metals, for example, it is possible to use a method wherein each of the metal raw materials are deposited on the support by using the CVD method or the like, are thermally decomposed, and then are nitrided by an ammonia gas.

The transition metal compound is not particularly limited, and examples thereof include an inorganic metal compound or an organic metal complex such as tri-ruthenium dodecacarbonyl $[Ru_3(CO)_{12}]$, dichloro tetrakis (triphenyl phosphine) ruthenium (II) $[RuCl_2(PPh_3)_4]$ dichloro-tris (triphenyl phosphine) ruthenium (II) $[RuCl_2(PPh_3)_3]$, tris(acetyl acetonato) ruthenium (III) $[Ru(acac)_3]$, ruthenocene $[Ru(C_5H_5)]$, ruthenium chloride $[RuCl_3]$, iron pentacarbonyl $[Fe(CO)_5]$, tetracarbonyl iron iodide $[Fe(CO)_4I_2)]$, iron chloride $[FeCl_3]$, ferrocene $[Fe(C_5H_5)_2]$, tris(acetyl acetonato) iron (III) $[Fe(acac)_3]$, triiron dodecacarbonyl $[Fe_3(CO)_{12}]$, cobalt chloride $[CoCl_3]$, tris(acetyl acetonato) cobalt (III) $[Co(acac)_3]$, cobalt (II) acetyl acetonate $[Co(acac)_2]$, cobalt octacarbonyl $[Co_2(CO)_8]$, cobaltocene $[Co(C_5H_5)_2]$, triosmium dodecacarbonyl $[Os_3(CO)_{12}]$, and molybdenum hexacarbonyl $[Mo(CO)_6]$, which are likely to be thermally decomposed.

As the impregnation method, the following steps can be used. For example, the support powders, or the molded body is dispersed into a transition metal compound solution (for example, a hexane solution of a Ru carbonyl complex), and stirred. At this time, the content of the transition metal compound is 0.01 to 40 wt %, preferably in a range of 0.02 to 30 wt %, and further preferably in a range of approximately 0.05 to 20 wt % with respect to support powders. After that, in an inert gas streams such as nitrogen, argon and helium, or in a vacuum state, the transition metal compound is heated at 50° C. to 200° C. for 30 minutes to 5 hours so as to evaporate a solvent, and thereby the transition metal compound is dried and solidified. Then, a catalyst precursor which is the dried and solidified transition metal compound is reduced. With the above-described steps, it is possible to obtain the supported metal catalyst in which transition metals such as Ru as the fine particles having a particle diameter of several nm to several hundreds of nm are supported on the support powders.

The specific surface area of the supported metal catalyst is in a range of approximately 0.1 to 200 $m^2/g$, and the supporting amount of the transition metals such as Ru is in a range of 0.01 to 30 wt %, is preferably 0.02 to 20 wt %, and is more preferably 0.05 to 10 wt %, with respect to the support powders or the molded body.

Further, instead of using the above-described method, it is possible to obtain the same supported metal catalyst by using a method, wherein, under the same conditions as those described in the above-described method, the calcium nitride or the Ca—N—H-based compound and the transition metal compound powder such as Ru are solid-phase mixed through the physical mixing method, and then heated so as to reduce and decompose the transition metal compound such as Ru to the transition metals such as Ru.

In addition, the supported metal catalyst of the present invention can be used as a molded body by using a typical molding technology. Specifically, examples of the shapes of the molded body include a granular shape, a spherical shape, a tablet shape, ring, a macaroni shape, a four-leaf clover shape, a dice shape, and a honeycomb shape. In addition, it is possible to use the supported metal catalyst of the present invention such that the catalyst is coated on an appropriate supporting body.

<Synthesis of Ammonia>

An ammonia synthesis method of the present invention is a method of synthesizing ammonia wherein nitrogen is reacted with hydrogen on a catalyst, and the above-described supported metal catalyst is used as the catalyst. A representative form of the reaction is a method performed in such a manner that a gas obtained by mixing nitrogen and hydrogen which are used as raw materials is directly reacted under heating and under pressure, and ammonia which is produced by the reaction of $N_2 + 3H_2 \rightarrow 2NH_3$ is cooled or absorbed by water so as to be separated, similar to the conventional Haber-Bosch method. The nitrogen and hydrogen gases are supplied to be in contact with the supported metal catalyst installed in the reactor. Unreacted nitrogen and hydrogen gases are recycled and circulated in the reactor after removing the produced ammonia. Before supplying the nitrogen and hydrogen gases, the surface of the supported metal catalyst is preferably subjected to a reduction treatment by using the hydrogen gas or the mixed gas of hydrogen and nitrogen to perform a pre-treatment of reducing and removing an oxide or the like which is formed on the supported transition metal such as Ru.

When the calcium nitride or the Ca—N—H-based compound is left in the atmosphere, water is preferentially absorbed and the compound is likely to be decomposed under an excessive amount of moisture. Therefore, it is preferable that the ammonia synthesis reaction is performed in an atmosphere which contains extremely low moisture.

That is, it is preferable to use the nitrogen and hydrogen gas having a content of moisture which is equal to or lower than 100 ppm, and more preferably equal to or lower than 50 ppm, as raw materials.

Next, the supported metal catalyst is heated under the atmosphere of the mixed gas of nitrogen and hydrogen which are the raw materials to synthesize ammonia. It is preferable to use a condition wherein the molar ratio of nitrogen to hydrogen is approximately 1/10 to 1/1, and preferably 1/5 to 1/1. A reaction temperature is preferably equal to or higher than 100° C. and lower than 600° C., preferably in a range of approximately 200° C. to 500° C., and more preferably in a range of approximately 250° C. to 500° C. As the reaction temperature is low, equilibrium is in favor of the ammonia production. The above-described range is preferable in order to realize a sufficient ammonia production rate and to make the equilibrium in favor of the ammonia production.

The reaction pressure used for the mixed gas of nitrogen and hydrogen at the time of performing the synthesis reaction is not particularly limited. However, the reaction pressure is preferably equal to or higher than 10 kPa and lower than 20 MPa. In terms of practical use, the reaction is preferably performed under pressurized conditions, and thus, the reaction pressure is more preferably in a range of approximately 100 kPa to 20 MPa in terms of practical use, and even in a case of being less than 3 MPa, the synthesis reaction can be sufficiently performed.

Examples of types of the synthesis reaction include a hatch type reaction, a closed circulation type reaction, and a flow type reaction system. The flow type reaction system is most preferably used from a practical point of view. In terms of the equilibrium, conditions of high pressure and low temperature are advantageous for the ammonia synthesis reaction. In addition, since the reaction is exothermic reaction, it is favorable that the reaction be performed while removing the reaction heat, and thus various improvements have been made to industrially increase the yield. For example, in a case of using a flow type reaction system, a method of obtaining a high yield of ammonia has been proposed, and the method has been proposed wherein a plurality of reactors with which the catalyst is filled are connected to each other in a row, an intercooler is installed at an outlet of each of the reactors so as to remove the heat, and thus an inlet temperature of each of the reactor is decreased, thereby increasing the yield of ammonia. Further, a method of accurately controlling an outlet temperature of each of the reaction layers has been also proposed, and the method is performed by using a reactor including a plurality of catalyst layers with which an Fe catalyst and a Ru-based catalyst are filled in the inside thereof.

In the present invention, similar to the conventional method which has been performed, it is possible to perform the ammonia synthesis by using one reactor or a plurality of reactors with which the catalyst is filled. As a catalyst to be used, the catalyst of the present invention can be used alone, a combination of two or more types of the catalyst selected from the catalysts of the present invention can be used, or a combination of the catalyst of the present invention and the well-known catalyst can be used. In addition, either of the method of connecting the plurality of reactors to each other, or the method of providing the plurality of reaction layers in the same reactor can be used.

In the present invention, in a case where the catalysts are used in combination, the activity of the catalyst of the present invention is high at the low temperature, and thus the catalyst is preferably used in the last reactor. That is, it is possible to obtain a high yield of ammonia by performing the last reaction at the low temperature which is in favor of the equilibrium.

Under the equilibrium reaction conditions for industrial ammonia synthesis, due to the equilibrium limitation, the concentration of ammonia in the reaction gas at the outlet of the reactor is equal to or less than 20%. Accordingly, after the ammonia produced in the reaction gas is cooled and removed, unreacted raw material can be recycled and used as the raw material after a portion of the impurities included in the reaction gas or the unreacted raw material is separated by membrane separation or the like and purged from the system.

As a hydrogen raw material used for the method of synthesizing ammonia, it is possible to use hydrogen raw materials which can be produced through various production methods shown below. Production methods, wherein coal, petroleum or natural gas is used as a raw material, such as a steam reforming method, a partial oxidation reforming method, an autothermal reforming method which is obtained by combining the steam reforming and the partial oxidation, and methods wherein these methods are combined with a shift reaction, and production methods such as a method of using biomass as a raw material, a method performed by water electrolysis, and a method of water decomposition performed by an optical catalyst can be used to generated the hydrogen.

In a case where the natural gas raw material is used as the raw material of the method of synthesizing ammonia, the hydrogen gas and the nitrogen gas are produced through the steps which include a steam reforming step of the natural gas, a partial oxidation reforming step, a CO shift reaction step, a $CO_2$ removing step, and a subsequent CO removing step performed by continuous CO methanation. Since the steam reforming reaction is endothermic, the reaction heat which is generated in the auto-thermal reaction is used, and the H/N ratio in a case where air is used as the nitrogen gas raw material is in a range of approximately 1.7 to 2.5 molar ratio. The unreacted gas of the steaming reforming method contains the hydrogen gas, and thus is preferably used as a recycle gas by circulating in the reforming step. Methods of efficiently performing a reaction by controlling the ratio of the fresh gas to the recycle gas have been developed, and in the present invention, the above-described method can be also used.

On the other hand, as a method of obtaining a raw material having the high H/N ratio, a method of using oxygen-enriched air has been developed. When such a raw material is used, an amount of recycled gas is decreased, and thus the aforementioned method is energetically preferred. Furthermore, a method in which, after compressing and separating of the air is performed, oxygen is used to produce hydrogen through an auto-thermal method and nitrogen is used for the reaction gas or industrial nitrogen is a method which is preferable in terms of the energy saving, and can be used as the method of producing the raw material used in the present invention.

Hereinafter, the present invention will be specifically described with reference to examples. The evaluation of the ammonia synthesis activity of the catalysts in the present invention and Comparative example was performed by acquiring a production amount of $NH_3$ by using a gas chromatograph, or by dissolving the produced $NH_3$ into a sulfuric acid aqueous solution, and quantifying the solution by using an ion chromatograph so as to acquire the ammonia synthesis rate.

EXAMPLE 1

<Production of Ru-supported $Ca_3N_2$>

1 g of $Ca_3N_2$ powder (BET surface area: about 1 $m^2$ $g^{-1}$) which is a commercially available reagent was mixed with 0.042 g of $Ru_3(CO)_{12}$ powder in a glove box under an Ar atmosphere, and the mixture was enclosed in vacuum quartz glass. The glass-enclosed sample was heated at 250° C. for 1.5 hours while being rotated. With this, a $Ca_3N_2$ catalyst on which 2 wt % of Ru metal particles were supported was obtained. The BET surface area of the aforementioned catalyst was about 1 $m^2$ $g^{-1}$, and the BET surface area was hardly changed after being supported. The dispersion degree (%) of Ru measured by using a CO adsorption method was 3.0.

<Ammonia Synthesis Reaction>

Figure 1:
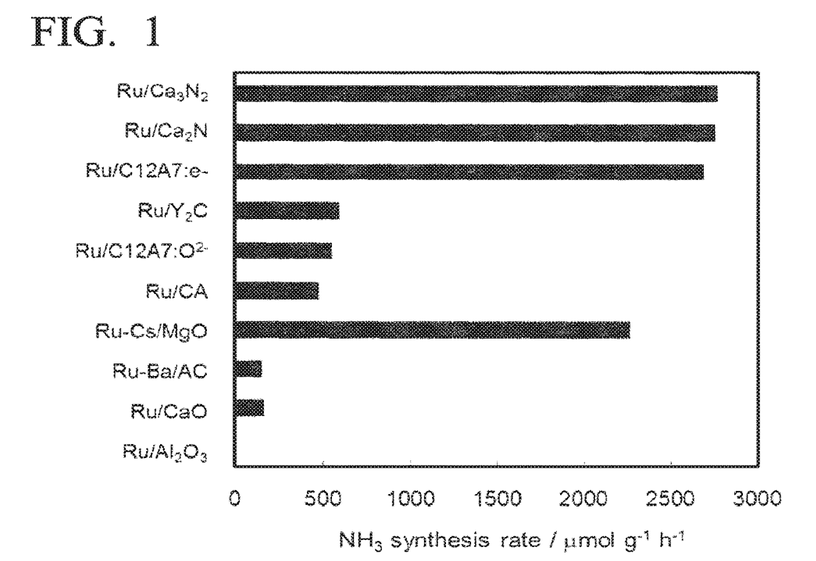
FIG. 1 is a graph illustrating catalytic activity of an ammonia synthesis reaction performed by a catalyst in which Ru is supported on various types of supports.

The synthesis reaction in which the nitrogen gas ($N_2$) reacts with the hydrogen gas ($H_2$) so as to produce an ammonia gas ($NH_3$) was performed. 0.2 g of the catalyst obtained by using the above-described method was packed in a glass tube in a case where the reaction temperature was 400° C., and 0.1 g of the catalyst obtained by using the above-described method was packed in a glass tube in a case where the reaction temperature was 340° C., so as to perform the synthesis reaction by using a fixed bed type flow reaction apparatus. The reaction was performed by setting the flow rate of gas such that $N_2$ was 15 mL/min and $H_2$ was 45 mL/min, which was 60 mL/min in total, and setting the pressure to be an atmospheric pressure. The gas discharged from the flow system reactor was caused to be bubbled in 0.005 M sulfuric acid aqueous solution to dissolve the produced ammonia in the solution, and quantification of the produced ammonia ion was performed using the ion chromatograph. The production rate of ammonia at 400° C. was 2760 µmol $g^{-1}$ $h^{-1}$ as illustrated in FIG. 1. The production rate of ammonia at 340° C. was 3164 µmmol $g^{-1}$ $h^{-1}$ as illustrated in Table 1. TOF ($\times 10^{-3}$ $s^{-1}$) was 164.2.

EXAMPLE 2

2 wt % of Ru/$Ca_2N$ catalyst was prepared by using the same method as that in Example 1 and the ammonia production reaction was performed under the same conditions as those in Example 1, except that $Ca_2N$ (BET surface area of 1 $m^2$ $g^{-1}$) was used instead of $Ca_3N_2$ used in Example 1. The production rate of ammonia at 400° C. was 2750 µmol $g^{-1}$ $h^1$ as illustrated in FIG. 1. The production rate of ammonia at 340° C. was 3386 µmol $g^{-1}$ $h^{-1}$ as illustrated in Table 1. TOF ($\times 10^{-3}$ $s^{-1}$) was 171.2.

EXAMPLE 3

2 wt % of Ru/$Ca(NH_2)_2$ catalyst was prepared by using the same method as that in Example 1 and the ammonia production reaction was performed under the same conditions as those in Example 1, except that $Ca(NH_2)_2$ (BET surface area of 120 $m^2$ $g^{-1}$) was used instead of $Ca_3N_2$ used in Example 1. The production rate of ammonia at 340° C. was 2118 µmol $g^{-1}$ $h^{-1}$ as illustrated in Table 1. TOF ($\times 10^{-3}$ $s^{-1}$) was 3.2.

EXAMPLE 4

2 wt % of Ru/CaNH catalyst was prepared by using the same method as that in Example 1 and the ammonia synthesis reaction was performed under the same conditions as those in Example 1, except that CaNH (BET surface area of 1 $m^2$ $g^{-1}$) was used instead of $Ca_3N_2$ used in Example 1. The production rate of ammonia at 340° C. was 1107 µmol $g^{-1}$ $h^{-1}$ as illustrated in Table 1. TOF ($\times 10^{-3}$ $s^{-1}$) was 38.4.

EXAMPLE 5

2 wt % of Ru/$Y_2C$ catalyst was prepared by using the same method as that in Example 1 and the ammonia synthesis reaction was performed under the same conditions as those in Example 1, except that $Y_2C$ (BET surface area of 0.2 $m^2$ $g^{-1}$) was used instead of $Ca_3N_2$ used in Example 1. The production rate of ammonia at 400° C. was 580 µmol $g^{-1}$ $h^{-1}$ as illustrated in FIG. 1. The production rate of ammonia at 340° C. was 1101 µmol $g^{-1}$ $h^{-1}$ as illustrated in Table 1. TOF ($\times 10^{-3}$ $s^{-1}$) was 59.4.

Table 1 indicates the results of the ammonia synthesis reactions performed using the catalysts in which Ru was supported on various types of supports (reaction temperature: 340° C., flow rate: 60 mL $min^{-1}$, pressure: 0.1 MPa, and $N_2$:$H_2$=1:3).

TABLE 1

| Example No. Comparative example No. | Catalyst | Catalyst surface area ($m^2$ $g^{-1}$) | Ru dispersion (%) | $NH_3$ production rate (µmol $g^{-1}$ $h^{-1}$) | TOF ($\times 10^{-3}$ $s^{-1}$) |
|---|---|---|---|---|---|
| Comparative example 7 | Ru/γ-$Al_2O_3$ | 170 | 20 | 10 | 0.1 |
| Comparative example 6 | Ru/CaO | 3 | 4.9 | 261 | 7.5 |
| Comparative example 5 | Ba—Ru/ Active carbon | 310 | 25.2 | 29 | 0.2 |
| Comparative example 4 | Cs—Ru/MgO | 12 | 25 | 2367 | 13.3 |
| Comparative example 3 | Ru/CaOAl2O3 | 1 | 4.5 | 22 | 0.7 |
| Comparative example 2 | Ru/C12A7:$O^{2-}$ | 1 | 4.6 | 88 | 2.7 |
| Comparative example 1 | Ru/C12A7:$e^-$ | 1 | 4.7 | 1571 | 52.1 |
| Example 5 | Ru/Y2C | 0.2 | 2.6 | 1101 | 59.4 |
| Example 4 | Ru/CaNH | 1 | 4.5 | 1107 | 38.4 |
| Example 3 | Ru/$Ca(NH_2)_2$ | 120 | 93.6 | 2118 | 3.2 |
| Example 2 | Ru/$Ca_2N$ | 1 | 3.1 | 3386 | 171.2 |
| Example 1 | Ru/$Ca_3N_2$ | 1 | 3.0 | 3164 | 164.2 |

EXAMPLE 6

0.5 wt % Ru/$Ca_3N_2$ catalyst was prepared by using the same method as that in Example 1 and the ammonia synthesis reaction was performed under the same conditions as those in Example 1, except that the amount of Ru supported on $Ca_3N_2$ in Example 1 was set to be 0.5 wt %. The synthesis rate of ammonia at 340° C. was 2009 µmol $g^{-1}$ $h^{-1}$ as illustrated in Table 2.

EXAMPLE 7

1.0 wt % Ru/$Ca_3N_2$ catalyst was prepared by using the same method as that in Example 1 and the ammonia synthesis reaction was performed under the same conditions as those in Example 1, except that the amount of Ru supported on $Ca_3N_2$ in Example 1 was set to be 1.0 wt %. The production rate of ammonia at 340° C. was 2399 µmol $g^{-1}$ $h^{-1}$ as illustrated in Table 2.

EXAMPLE 8

3.0 wt % Ru/$Ca_3N_2$ catalyst was prepared by using the same method as that in Example 1 and the ammonia synthesis reaction was performed under the same conditions as those in Example 1, except that the amount of Ru supported on $Ca_3N_2$ in Example 1 was set to be 3.0 wt %. The production rate of ammonia at 340° C. was 3446 µmol $g^{-1}$ $h^{-1}$ as illustrated in Table 2.

EXAMPLE 9

5.0 wt % $Ru/Ca_3N_2$ catalyst was prepared by using the same method as that in Example 1 and the ammonia synthesis reaction was performed under the same conditions as those in Example 1, except that Ru loading supported on $Ca_3N_2$ in Example 1 was set to be 5.0 wt %. The production rate of ammonia at 340° C. was 3922 µmol $g^{-1}$ $h^{-1}$ as illustrated in Table 2.

Table 2 indicates the results of the ammonia synthesis reactions performed using $Ca_3N_2$ having different Ru-loading (reaction temperature: 340° C., flow rate: 60 mL $min^{-1}$, pressure: 0.1 MPa, and $N_2:H_2=1:3$).

TABLE 2

| Example No. Comparative example No. | Ru loading (wt %) | Surface area ($m^2$ $g^{-1}$) | Ammonia production rate (µmol $g^{-1}$ $h^{-1}$) |
| --- | --- | --- | --- |
| Example 6 | 0.5 | 1.0 | 2009 |
| Example 7 | 1 | 1.0 | 2399 |
| Example 1 | 2 | 1.0 | 3164 |
| Example 8 | 3 | 1.0 | 3446 |
| Example 9 | 5 | 1.0 | 3922 |

EXAMPLE 10

<Synthesis of Co-supported $Ca_3N_2$>

1 g of $Ca_3N_2$ powder, which is a commercially available reagent, was mixed with 0.058 g of $Co_2(CO)_8$ powder in a glove box under an Ar atmosphere, and the mixture was enclosed in vacuum quartz glass. The glass-enclosed sample was heated at 250° C. for 15 hours. With this, a $Ca_3N_2$ catalyst on which 2 wt % of Co metal was supported was obtained. The BET surface area of the aforementioned catalyst was about 1 $m^2$ $g^{-1}$. The ammonia synthesis reaction was performed using the synthesized catalyst under the same conditions as those in Example 1. The production rate of ammonia at 340° C. was 439 µmol $g^{-1}$ $h^{-1}$ as illustrated in Table 3.

EXAMPLE 11

<Synthesis of Fe-supported $Ca_3N_2$>

1 g of $Ca_3N_2$ powder which is a commercially available reagent was mixed with 0.065 g of $Fe_2(CO)_8$ powder in a glove box under an Ar atmosphere, and the mixture was enclosed in vacuum quartz glass. The glass-enclosed sample was heated at 250° C. for 15 hours. With this, a $Ca_3N_2$ catalyst on which 2 wt % of Fe metal was supported was obtained. The BET surface area of the aforementioned catalyst was about 1 $m^2$ $g^{-1}$. The ammonia synthesis reaction was performed by using the synthesized catalyst under the same conditions as those in Example 1. The production rate of ammonia at 340° C. was 284 µmol $g^{-1}$ $h^{-1}$ as illustrated in Table 3.

Table 3 indicates the results of the ammonia synthesis reactions performed using $Ca_3N_2$ on which various types of transition metals were supported (reaction temperature: 340° C., flow rate: 60 mL $min^{-1}$, pressure: 0.1 MPa, and $N_2:H_2=1:3$).

TABLE 3

| Example No. Comparative example No. | Catalyst | Surface area ($m^2$ $g^{-1}$) | Ammonia production rate (µmol $g^{-1}$ $h^{-1}$) |
| --- | --- | --- | --- |
| Example 1 | $Ru/Ca_3N_2$ | 1.0 | 3164 |
| Example 10 | $Co/Ca_3N_2$ | 1.0 | 439 |
| Example 11 | $Fe/Ca_3N_2$ | 1.0 | 284 |

EXAMPLE 12

2 wt % of $Ru/Mg_3N_2$ catalyst was prepared by using the same method as that in Example 1 and the ammonia synthesis reaction was performed under the conditions in Example 1, except that $Mg_3N_2$ (BET surface area of 1 $m^2$ $g^{-1}$) was used instead of $Ca_3N_2$ used in Example 1. The production rate of ammonia at 340° C. was 365 µmol $g^{-1}$ $h^{-1}$ as illustrated in Table 4. TOF ($\times 10^{-3}$ $s^{-1}$) was 16.9.

EXAMPLE 13

2 wt % of $Ru/Sr_2N$ catalyst was prepared by using the same method as that in Example 1 and the ammonia synthesis reaction was performed under the conditions in Example 1, except that $Sr_2N$ (BET surface area of 1 $m^2$ $g^{-1}$) was used instead of $Ca_3N_2$ used in Example 1. The productions rate of ammonia at 340° C. was 1520 µmol $g^{-1}$ $h^{-1}$ as illustrated in Table 4. TOF ($\times 10^{-3}$ $s^{-1}$) was 70.2.

EXAMPLE 14

2 wt % of $Ru/Ba_2N$ catalyst was prepared by using the same method as that in Example 1 and the ammonia synthesis reaction was performed under the conditions in Example 1, except that $Ba_2N$ (BET surface area of 1 $m^2$ $g^{-1}$) was used instead of $Ca_3N_2$ used in Example 1. The production rate of ammonia at 340° C. was 566 µmol $g^{-1}$ $h^{-1}$ as illustrated in Table 4. TOF ($\times 10^{-3}$ $s^{-1}$) was 26.1.

Table 4 indicates the results of the ammonia synthesis reactions performed using the catalyst in which Ru (2 wt %) was supported on the various types of metal nitride supports (reaction temperature: 340° C., flow rate: 60 mL $min^{-1}$, pressure: 0.1 MPa, and $N_2:H_2=1:3$).

TABLE 4

| Example No. Comparative example No. | Catalyst | Surface area ($m^2g^{-1}$) | Ammonia production rate (µmol $g^{-1}$ $h^{-1}$) | TOF ($\times 10^3$ $s^{-1}$) |
| --- | --- | --- | --- | --- |
| Example 1 | $Ru/Ca_3N_2$ | 1.0 | 3164 | 164.0 |
| Example 2 | $Ru/Ca_2N$ | 1.0 | 3368 | 171.0 |
| Example 12 | $Ru/Mg_3N_2$ | 1.0 | 365 | 16.9 |
| Example 13 | $Ru/Sr_2N$ | 1.0 | 1520 | 70.2 |
| Example 14 | $Ru/Ba_2N$ | 1.0 | 566 | 26.1 |

COMPARATIVE EXAMPLE 1

<Synthesis of mayenite Type Compound Powder>

$CaCO_3$ and $Al_2O_3$ powders were mixed such that the ratio of Ca to Al was 11:14, and 30 g of the mixture in total was heated at 1300° C. for six hours in an alumina crucible. The obtained powders were put into a silica glass tube and heated at 1100° C. for 15 hours in a vacuum of $1 \times 10^{-4}$ Paso as to obtain mayenite type compound powders of the raw material. The specific surface area in this stage was equal to or less than 1 $m^2$ $g^{-1}$.

<Electron Injection by the Reduction Treatment>

3 g of powders obtained as described above were put into a silica glass tube together with 0.18 g of metal Ca powders, and heated at 700° C. for 15 hours so as to react with the powders by setting the inside of the silica glass tube to be in a state of the metal Ca vapor atmosphere. The enclosed sample in the vacuum state was then took out, crushed by using a mortar, and packed in the silica glass tube again and sealing was performed while being in the vacuum state. The sample was heated at 1100° C. for two hours to obtain conductive mayenite type compound powder C12A7:e$^-$ having a concentration of conduction electron of $2 \times 10^{21}$ cm$^3$ and a specific surface area of 1 m$^2$ g$^{-1}$. 2 wt % of Ru was supported and the ammonia synthesis reaction was performed under the same conditions as those in Example 1, except that C12A7:e$^-$ was used. The production rate of ammonia at 400° C. was 2684 µmol g$^{-1}$ h$^{-1}$ as illustrated in FIG. 1. The production rate of ammonia at 340° C. was 1571 µmol g$^{-1}$ h$^{-1}$ as illustrated in Table 1. TOF ($\times 10^{-3}$ s$^{-1}$) was 52.1.

COMPARATIVE EXAMPLE 2

2 wt % of Ru/C12A7 catalyst was prepared by using the same method as that in Example 1 and the ammonia production reaction was performed under the same conditions as those in Example 1, except that C12A7 (non-doping), which has a chemical equivalent composition wherein conduction electron was not included, was used instead of the conductive mayenite type compound used in Comparative example 1. The production rate of ammonia at 400° C. was 546 mmol g$^{-1}$ h$^{-1}$ as illustrated in FIG. 1. The production rate of ammonia at 340° C. was 88 µmol g$^{-1}$ h$^{-1}$ as illustrated in Table 1. TOF ($\times 10^{-3}$ s$^{-1}$) was 2.7.

COMPARATIVE EXAMPLE 3

2 wt % of Ru/CA catalyst was prepared by using the same method as that in Example 1 and the ammonia synthesis reaction was performed under the same conditions as those in Example 1, except that CaO.Al$_2$O$_3$ (denoted by CA) (BET surface area of 1 m$^2$ g$^{-1}$) was used instead of Ca$_3$N$_2$ used in Example 1. The production rate of ammonia at 400° C. was 467 µmol g$^{-1}$ h$^{-1}$ as illustrated in FIG. 1. The production rate of ammonia at 340° C. was 22 µmol g$^{-1}$ h$^{-1}$ as illustrated in Table 1. TOF ($\times 10^{-3}$ s$^{-1}$) was 0.7.

COMPARATIVE EXAMPLE 4

2 wt % of Ru—Cs/MgO catalyst (Cs/Ru element ratio=1) was prepared by using the same method as that in Example 1 and the ammonia synthesis reaction was performed under the same conditions as those in Example 1, except that Cs-added MgO (denoted by Cs/MgO) (BET surface area of 12 m$^2$ g$^{-1}$) was used instead of Ca$_3$N$_2$ in Example 1. The production rate of ammonia at 400° C. was 2264 µmol g$^{-1}$ h$^{-1}$ as illustrated in FIG. 1. The synthesis rate of ammonia at 340° C. was 2367 µmol g$^{-1}$ h$^{-1}$ as illustrated in Table 1. TOF ($\times 10^{-3}$ s$^{-1}$) was 13.3.

COMPARATIVE EXAMPLE 5

2 wt % of Ru—Ba/C catalyst (Ba/Ru element ratio=1) was prepared by using the same method as that in Example 1 and the ammonia synthesis reaction was performed under the same conditions as those in Example 1, except that Ba-added active carbon (denoted by Ba/AC) (BET surface area of 310 m$^2$ g$^{-1}$) was used instead of Ca$_3$N$_2$ used in Example 1. The production rate of ammonia at 400° C. was 148 µmol g$^{-1}$ h$^{-1}$ as illustrated in FIG. 1. The production rate of ammonia at 340° C. was 29 µmol g$^{-1}$ h$^{-1}$ as illustrated in Table 1. TOF ($\times 10^{-3}$ s$^{-1}$) was 0.2.

COMPARATIVE EXAMPLE 6

2 wt % of Ru/CaO catalyst was prepared by using the same method as that in Example 1 and the ammonia synthesis reaction was performed under the same conditions as those in Example 1, except that CaO (BET surface area of 3 m$^2$ g$^{-1}$) was used instead of Ca$_3$N$_2$ in Example 1. The production rate of ammonia at 400° C. was 158 µmol g$^{-1}$ h$^{-1}$ as illustrated in FIG. 1. The production rate of ammonia at 340° C. was 261 µmol g$^{-1}$ h$^{-1}$ as illustrated in Table 1. TOF ($\times 10^{-3}$ s$^{-1}$) was 7.5.

COMPARATIVE EXAMPLE 7

2 wt % of Ru/Al$_2$O$_3$ catalyst was prepared by using the same method as that in Example 1 and the ammonia synthesis reaction was performed under the same conditions as those in Example 1, except that Al$_2$O$_3$ (BET surface area of 170 m$^2$ g$^{-1}$) was used instead of Ca$_3$N$_2$ in Example 1. The production rate of ammonia at 400° C. was 8.5 µmol g$^{-1}$ h$^{-1}$ as illustrated in FIG. 1. The production rate of ammonia at 340° C. was 10 µmol g$^{-1}$ h$^{-1}$ as illustrated in Table 1. TOF ($\times 10^{-3}$ s$^{-1}$) was 0.1.

[Comparing of Ammonia Synthesis Rates]

From the ammonia production rates shown in Table 1, it was found that, as compared with the catalysts in which Ru was supported on the known catalyst supports (Al$_2$O$_3$, CaO, Ba/AC, Cs/MgO, and CA), Ca$_3$N$_2$ and Ca$_2$N on which Ru was supported were very excellent catalysts having high catalytic activity per the same weight, and exhibited a high TOF value even though having a small specific surface area. It was also found that the aforementioned catalytic activity is higher than that of C12A7:e$^-$ on which Ru was supported.

On the other hand, Y$_2$C on which Ru was supported used in Example 5 had a inferior ammonia production rate per unit weight compared with Ru/C12A7:e$^-$. However, taking the BET surface area thereof which is 0.2 m$^2$/g$^{-1}$ into consideration, it was confirmed that the catalyst had catalystic performance which was comparable with Ru/C12A7:e$^-$ regarding the catalytic activity per surface area.

[Evaluation Test 1]

Figure 2:
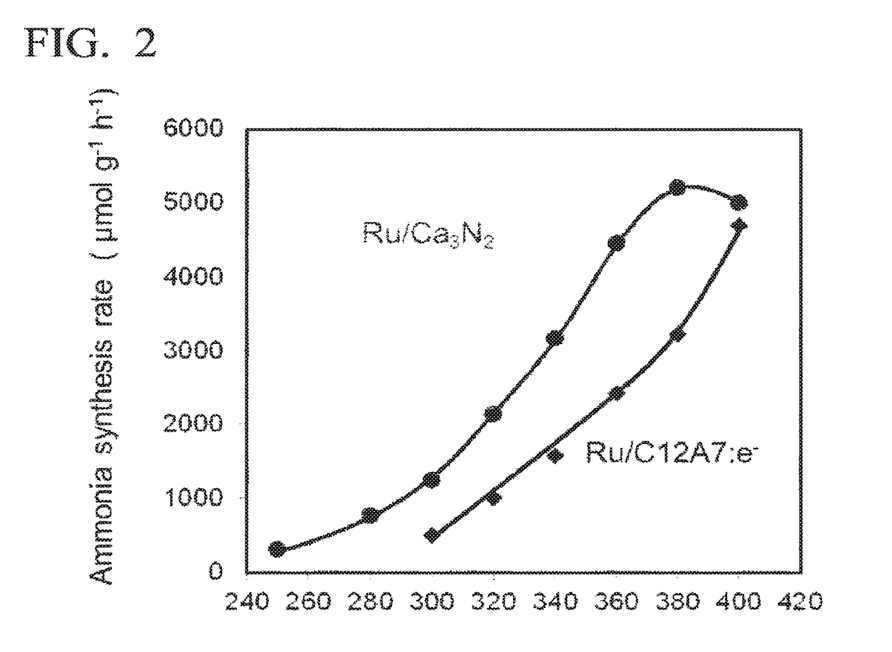
FIG. 2 is a graph illustrating an ammonia synthesis rate (vertical axis) when the ammonia synthesis reaction is performed by using Ru-supported $Ca_3N_2$ and Ru-supported C12A7:e⁻ at various reaction temperatures (horizontal axis; ° C.).

The reaction temperature dependency of the catalyst was evaluated by performing an ammonia synthesis reaction under the same conditions as those in Example 1 except for the reaction temperature. The reaction was performed by setting the amount of the catalyst to be 0.1 g, the flow rate of the gas such that N$_2$ was 15 mL/min and H$_2$ was 45 mL/min, which was 60 mL/min in total, and the pressure to be an atmospheric pressure. FIG. 2 illustrates the results obtained by performing the ammonia synthesis reactions by using 2 wt % of Ru/Ca$_3$N$_2$ and 2 wt % of Ru/C12A7:e$^-$ as the catalyst at various reaction temperatures. The activity was almost the same at 400° C. However, in a low temperature area at equal to or lower than 340° C., it was clear that 2 wt % of Ru/Ca$_3$N$_2$ had approximately two times the catalytic activity compared with 2 wt % of Ru/C12A7:e$^-$.

[Evaluation Test 2]

Figure 3:
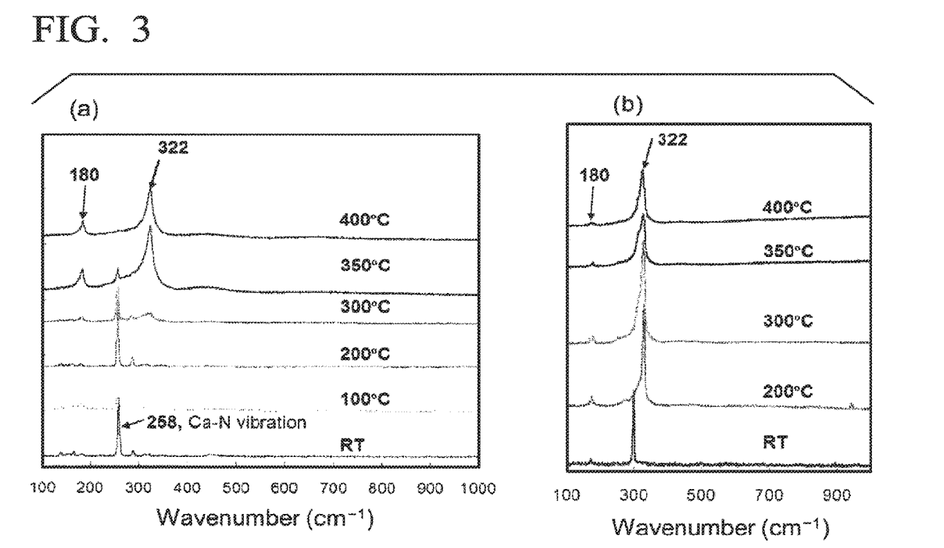
FIG. 3 is a diagram illustrating a result of a Raman spectra of Ru-supported $Ca_3N_2$(a) and $Ca_2N$(b) under the same conditions as those in the ammonia synthesis reaction.

FIG. 3 illustrates the results obtained by examining the change of structures of 2 wt % of Ru/Ca$_3$N$_2$ catalyst (a) and 2 wt % of Ru/Ca$_2$N catalyst (b) based on a Raman spectra while performing the ammonia synthesis reaction under the same conditions as those in Example 1 except for the reaction temperature. When the reaction temperature was increased, a peak derived from Ca—N stretching vibration which was shown at 258 cm$^{-1}$ was decreased in 2 wt % of Ru/Ca$_3$N$_2$, and when the reaction temperature became 350° C., two peaks were shown at 180 cm$^{-1}$ and 322 cm$^{-1}$.

On the other hand, when 2 wt % of Ru/Ca$_2$N was heated under the nitrogen and hydrogen gas stream, which was the ammonia synthesis condition, similarly, two peaks were shown at 180 cm$^{-1}$ and 322 cm$^{-1}$. From the above-described results, it was clear that when 2 wt % Ru/Ca$_3$N$_2$ was heated at 350° C. under the conditions of the ammonia synthesis reaction, the structure thereof was changed to a structure similar to Ca$_2$N, and high catalytic activity was exhibited.

[Evaluation Test 3]

Figure 4:
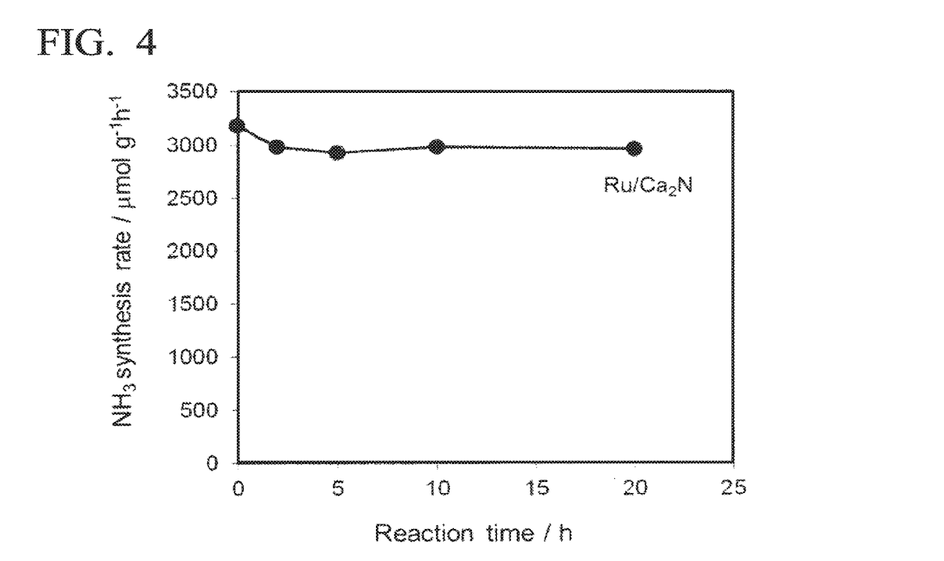
FIG. 4 is a graph illustrating a result of a stability evaluation test for a catalyst of Example 2 (horizontal axis; reaction time, and vertical axis; ammonia synthesis rate).

The stability of the catalyst was evaluated by continuously performing the synthesis reaction at the reaction temperature of 340° C. for 20 hours. FIG. 4 illustrates the results of the ammonia synthesis performed by using 2 wt % of Ru/Ca$_2$N of Example 2 as the catalyst. It was found that ammonia was stably produced even with the reaction of about 20 hours, and the reaction activity was hardly deteriorated.

The ammonia synthesis activity of the catalyst, in which Co or Fe other than Ru was supported on Ca$_3$N$_2$, evaluated at the reaction temperature of 340° C. is indicated in Table 2. The performance of the catalyst on which Co or Fe was supported (Example 6 and Example 7) was inferior compared with that of 2 wt % of Ru/Ca$_3$N$_2$ used in Example 1. However, the aforementioned catalyst showed catalyst performance which was comparable with the known Ru catalyst other than Ru—Cs/MgO used in Comparative example 4, or showed even superior catalyst performance.

The activity of ammonia synthesis of the catalyst in which 2 wt % of Ru was supported on a calcium nitride (Ca$_3$N$_2$ and Ca$_2$N), a magnesium nitride, a strontium nitride and a barium nitride (Mg$_3$N$_2$, Sr$_2$N, and Ba$_2$N), evaluated at the reaction temperature of 340° C. was indicated in Table 3. The performance of the catalysts of 2 wt % of Ru/Mg$_3$N$_2$ in Example 8, 2 wt % of Ru/Sr$_2$N in Example 9 and 2 wt % of Ru/Ba$_2$N in Example 10 was inferior compared with 2 wt % of Ru/Ca$_3$N$_2$ or 2 wt % of Ru/Ca$_2$N. However, the aforementioned catalysts exhibited higher catalyst performance than the known Ru catalyst other than Ru—Cs/MgO used in Comparative example 4.

INDUSTRIAL APPLICABILITY

Currently, the synthesizing method (the Haber-Bosch method) performed by using a doubly promoted iron catalyst containing several weight % of Al$_2$O$_3$ and K$_2$O in Fe$_3$O$_4$, which is widely used in producing ammonia, requires high pressure of about equal to or higher than 20 MPa. On the other hand, in the method of the present invention, high pressure is not required, and the synthesis reaction can be sufficiently performed at a pressure which is lower than 20 MPa, or at a relatively low pressure of lower than 3 MPa. Further, it can be said that the method of the present invention is a preferable method in terms of simplification of the manufacturing process, and reduction of energy consumption. In addition, it is possible to produce ammonia inexpensively with remarkably high efficiency compared with the conventional Ru catalyst.

The invention claimed is:

1. A supported metal catalyst, comprising:
a transition metal which exhibits catalytic activity,
wherein the transition metal is supported by a support, and the support is a two-dimensional electride or a precursor thereof,
wherein the two-dimensional electride or a precursor thereof is a metal nitride represented by MxNyHz or a hydride thereof,
wherein
M represents one or two or more of Group II metals selected from the group consisting of Mg, Ca, Sr and Ba, and
x, y and z are in ranges of 1≤x≤11, 1≤y≤8, and 0≤z≤4 respectively, in which x is an integer, and y and z are not limited to an integer.

2. The supported metal catalyst according to claim 1, wherein the supported metal catalyst is a catalyst suitable for synthesizing ammonia.

3. The supported metal catalyst according to claim 1, wherein the supported metal catalyst is a catalyst suitable for synthesizing ammonia, wherein a gas comprising hydrogen and nitrogen is used as a raw material.

4. The supported metal catalyst according to claim 2, wherein the ammonia is synthesized continuously.

5. The supported metal catalyst according to claim 1, wherein the two-dimensional electride or a precursor thereof is a metal nitride represented by M$_3$N$_2$.

6. The supported metal catalyst according to claim 1, wherein the two-dimensional electride or a precursor thereof is at least one of Ca$_3$N$_2$ and Mg$_3$N$_2$.

7. The supported metal catalyst according to claim 1, wherein the two-dimensional electride or a precursor thereof is a Ca—N—H-based compound.

8. The supported metal catalyst according to claim 1, wherein the transition metal is at least one selected from the group consisting of Cr, Mo, W, Mn, Tc, Re, Fe, Ru, Os, Co, Rh and Ir.

9. The supported metal catalyst according to claim 1, wherein the transition metal is at least one selected from the group consisting of Ru, Co and Fe.

10. The supported metal catalyst according to claim 1, wherein an amount of the transition metal is in a range of 0.01 to 30 wt % with respect to that of the support.

11. A method of synthesizing ammonia, comprising: preparing (a) the supported metal catalyst of claim 1, and (b) gas comprising hydrogen and the nitrogen, which is used as a raw material; and reacting the nitrogen with the hydrogen on the catalyst in an ammonia synthesis reaction device, in which the supported metal catalyst is provided, to synthesize ammonia.

12. The method of synthesizing ammonia according to claim 11, wherein the reaction of the nitrogen and the hydrogen is performed at a reaction temperature which is equal to or higher than 100° C. and equal to or lower than 600° C.

13. The method of synthesizing ammonia according to claim 11, wherein the reaction of the nitrogen and the hydrogen is performed at a reaction pressure which is equal to or higher than 10 kPa and lower than 20 MPa.

14. A supported metal catalyst, comprising:
a transition metal which exhibits catalytic activity,
wherein the transition metal is supported by a support, and the support is a two-dimensional electride or a precursor thereof, wherein
the two-dimensional electrode or a precursor thereof is selected from (a) to (c):
(a) at least one compound selected from the group consisting of $Ca_2N$, $Sr_2N$, $Ba_2N$, $Ca_2NH$, $CaNH$, $Ca(NH_2)_2$, $Y_2C$, $Sc_2C$, $Gd_2C$, $Tb_2C$, $Dy_2C$, $Ho_2C$ and $Er_2C$;
(b) at least one compound selected from the group consisting of $Ca_2N$, $Sr_2N$ and $Ba_2N$, wherein a part of Ca of $Ca_2N$, Sr of $Sr_2N$, and Ba of $Ba_2N$ is substituted with at least one or more of alkaline metal elements selected from the group consisting of Li, Na. K, Rb and Cs; and
(c) a metal carbide selected from the group consisting of $Y_2C$, $Sc_2C$, $Gd_2C$, $Tb_2C$, $Dy_2C$, $Ho_2C$ and $Er_2C$, or is a hydride thereof.

15. A method of synthesizing ammonia, comprising: preparing (a) the supported metal catalyst of claim 14, and (b) gas comprising hydrogen and the nitrogen, which is used as a raw material; and reacting the nitrogen with the hydrogen on the catalyst in an ammonia synthesis reaction device, in which the supported metal catalyst is provided, to synthesize ammonia.

16. The method of synthesizing ammonia according to claim 15, wherein the reaction of the nitrogen and the hydrogen is performed at a reaction temperature which is equal to or higher than 100° C. and equal to or lower than 600° C.

17. The method of synthesizing ammonia according to claim 15, wherein the reaction of the nitrogen and the hydrogen is performed at a reaction pressure which is equal to or higher than 10 kPa and lower than 20 MPa.

18. The supported metal catalyst according to claim 14, wherein the transition metal is at least one selected from the group consisting of Cr, Mo, W, Mn, Tc, Re, Fe, Ru, Os, Co,Rh and Ir.

19. The supported metal catalyst according to claim 14, wherein the transition metal is at least one selected from the group consisting of Ru, Co and Fe.

20. The supported metal catalyst according to claim 14, wherein an amount of the transition metal is in a range of 0.01 to 30 wt % with respect to that of the support.

* * * * *